United States Patent [19]

Hagedorn et al.

[11] Patent Number: 5,650,102
[45] Date of Patent: Jul. 22, 1997

[54] PROCESS FOR MICROENCAPSULATION USING OIL-SOLUBLE EMULSIFIERS

[75] Inventors: Manfred Hagedorn, Troisdorf; Peter-Roger Nyssen; Jürgen Weisser, both of Dormagen, all of Germany

[73] Assignee: Bayer Aktiengesellschaft, Leverkusen, Germany

[21] Appl. No.: 541,992

[22] Filed: Oct. 6, 1995

[30] Foreign Application Priority Data

Oct. 13, 1994 [DE] Germany ............. 44 36 535.7

[51] Int. Cl.$^6$ ............. B01J 13/16; A61K 9/50
[52] U.S. Cl. ............. 264/4.7; 424/497; 503/215; 512/4; 514/963
[58] Field of Search ............. 264/4.7; 424/497; 503/215; 514/963

[56] References Cited

U.S. PATENT DOCUMENTS

| | | | |
|---|---|---|---|
| 4,021,364 | 5/1977 | Speiser et al. | 264/4.7 X |
| 4,342,739 | 8/1982 | Kakimi et al. | 424/497 X |
| 4,428,978 | 1/1984 | Jabs et al. | 264/4.7 X |
| 4,534,783 | 8/1985 | Beestman | 264/4.7 X |
| 4,622,267 | 11/1986 | Riecke | 264/4.7 X |
| 4,876,290 | 10/1989 | Vivant | 428/402.21 X |
| 5,075,279 | 12/1991 | Sano | 503/215 |
| 5,164,126 | 11/1992 | Kalishek et al. | 264/4.7 |
| 5,342,556 | 8/1994 | Träubel et al. | 264/4.7 |
| 5,433,953 | 7/1995 | Tsuei et al. | 264/4.7 X |

FOREIGN PATENT DOCUMENTS

| | | |
|---|---|---|
| 0278878 | 8/1988 | European Pat. Off. |
| 2753767 | 6/1979 | Germany. |

OTHER PUBLICATIONS

Patent Abstracts of Japan, vol. 106, No. 128, abstract of JP 03-293,025 (1991).
Patent Abstracts of Japan, vol. 6, No. 68, abstract of JP 57-7,234 (1982).

*Primary Examiner*—Richard D. Lovering
*Attorney, Agent, or Firm*—Sprung Horn Kramer & Woods

[57] ABSTRACT

In the process for the preparation of microcapsule dispersions by an interface polyaddition process in which an oil-in-water emulsion is prepared from an oily phase, which comprises the substance to be encapsulated and a lipophilic substance capable of polyaddition, and on aqueous phase, and the reaction partner required for the polyaddition is then added to the aqueous phase, capsules with smaller particle sizes are obtained, with a saving in emulsifying energy, if an oil-soluble emulsifier is added to the oily phase before the emulsification.

2 Claims, No Drawings

PROCESS FOR MICROENCAPSULATION USING OIL-SOLUBLE EMULSIFIERS

In microencapsulation processes which proceed in accordance with the principle of interface polyaddition, the preparation of an oil-in-water emulsion is necessary as the first step. The discontinuous oily phase here in general comprises the substances to be encapsulated, a lipophilic solvent if appropriate, and a substance which is capable of polyaddition. The substances to be encapsulated may be any desired substances, for example dyestuffs, leuco dyestuffs, paraffin oils, plant protection agents, insecticides and pharmaceuticals. However, they should be oil-soluble to a sufficient degree and should not react with the wall-forming agents.

The substances which are capable of polyaddition and are also dissolved in the oily phase can be, for example, monomeric or oligomeric polyisocyanates or polyepoxides.

When the reaction partner necessary for the polyaddition, which is in general a water-soluble amine, is added to the continuous aqueous phase, a high molecular weight polyaddition product, which constitutes the capsule wall and encloses the oil drops, is formed at the interface between the oil and water within a short time. When the polyaddition reaction has ended, a dispersion of microcapsules in water results.

A central process step of this microencapsulation method is the generation of a stable oil-in-water emulsion. This is achieved by using emulsifiers which produce the surface tension between the oil and water axed/or by the use of stabilizers (sometimes also called a protective colloid) which prevent coalescence, i.e. counteracts the merging of oil droplets which have already formed. The addition of emulsifiers may be dispensed with, when appropriate, for emulsification of oily phases of low surface tension. DE-A 3 346 601 thus describes merely the addition of protective colloids, for example polyvinyl alcohols, to the aqueous phase without the use of emulsifiers. A disadvantage here is that high shearing forces must be applied for the emulsification.

According to DE-A 2 753 767, for emulsification and stabilization of the emulsion emulsifying auxiliaries, for example carboxymethylcellulose, gelatin, polyvinyl alcohol (stabilizers) and 3-benzyl-hydroxy-biphenyl reaction products of nonyl-phenol with various mounts of ethylene oxide and sorbitan fatty acid esters (emulsifiers), are added to the aqueous phase.

EP-A 140 770 also describes the addition of emulsifying auxiliaries and protective colloids to the aqueous phase.

According to U.S. Pat. No. 5,164,126, a water-soluble polymer having surface-active properties which combines the properties of an emulsifier and a stabilizer is added to the aqueous phase.

U.S. Pat. No. 4,876,290 discloses an interface polyaddition process for the preparation of microcapsules in which a surface tension between the oily and aqueous phase in the range from 0 to 20 mN/m is established by addition of surface-active substances. Here also, the surface-active substances are classified into protective colloids and surfactant. These are added to the aqueous phase separately or as a mixture with one another.

To date, for preparation of oil-in-water emulsion for microencapsulation processes, emulsifiers or surface-active substances which are added to the aqueous phase and are preferably water-soluble have always been used. Furthermore, a relatively large amount of emulsifying energy is required in conventional processes for the preparation of microcapsule dispersions, the volume distribution curve of the microcapsules in the dispersion is often undesirably wide and the throughput per unit time is not at an optimum level, especially in continuous emulsifying processes.

A process has now been found for the preparation of microcapsule dispersions which is carried out in accordance with an interface polyaddition process in which an oil-in-water emulsion is prepared from an oily phase, which comprises the substance to be encapsulated and a lipophilic substance capable of polyaddition, and an aqueous phase, and the reaction partner required for the polyaddition is then added to the aqueous phase, which is characterized in that an oil-soluble emulsifier is added to the oily phase before the emulsification.

It is often advantageous also to use stabilizers (protective colloids) in addition to the oil-soluble emulsifiers. The stabilizers can correspond to the prior art and, if they are employed, are added to the aqueous phase.

Preferred oil-soluble emulsifiers are non-ionic types, for example fatty acid esters, fatty amides, polyglycol ethers and polypropylene glycol ethers. These should have a solubility in the oily phase of at least 0.01% by weight, preferably 0.01 to 2% by weight.

Suitable fatty acid esters are, for example, those of fatty acids having 8 to 18 C atoms and ethylene glycol, polyethylene glycol, propylene glycol, glycerol polyglycerol, sorbitol, pentaerythritol, glycerol esters or sucrose as the alcohol component.

Suitable fatty amides are, for example those of fatty acids having 8 to 18 C atoms and aliphatic amines, polyamines, alkanolamines, amino esters and amino ethers.

Suitable polyglycol ethers and polypropylene glycol ethers are, for example, those with alcohols, thiols, hydroxycarboxylic acid esters, sugars, fatty amines, polyamines, fatty acid alkanolamides, fat hydrolysates, polypropylene glycol, alkylphenols, condensed phenols and abletic acid.

Particularly preferred oil-soluble emulsifiers are fatty alcohol polyglycol ethers of the following formula

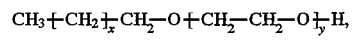

in which x represents an integer from 10 to 16 and y represents an integer from 4 to 12.

The oil-soluble emulsifiers can be used, for example, in a concentration of 0.02 to 1% by weight, preferably 0.05 to 1% by weight, based on the oily phase.

The interface polyaddition processes are preferably those in which polyurea is formed as the capsule wall material at the interface from the isocyanates dissolved in the oily phase and the amines to be added to the aqueous phase.

The lipophilic substances which are capable of polyaddition are preferably polyisocyanates, in particular aliphatic di- and, or triisocyanates, oligomers of aliphatic and/or aromatic di- and/or triisocyanates of the biuret type with free NCO groups, oligomers of aliphatic and/or aromatic diisocyanates of the isocyanurate type, reaction products of oligomers of aliphatic and/or aromatic di- and/or triisocyanates and carbon dioxide, of the oxadiazinetrione type with free NCO groups, oligomers of aliphatic and/or aromatic di- and/or disocyanates of the allophanate type with free NCO groups, and oligomers of mixed aliphatic-aromatic diisocyanates and aromatic di- and/or triisocyanates.

The lipophilic substances which are capable of polyaddition are usually employed as a solution in an inert oil, this oil also containing the substances to be encapsulated. The inert oils are those which do not undergo reactions with the wall-forming agents and the substances to be encapsulated under the conditions for the microencapsulations. Examples of possible substances are: aromatic, aliphatic and naphthenic hydrocarbons and mixtures thereof, carboxylic acid esters, chlorinated paraffins, naturally occurring oils of animal or vegetable origin, naturally occurring fats having melting points in the range from 10° to 35° C., and aromatic and aliphatic ethers.

The reaction partners which are required for the polyaddition and are to be added to the aqueous phase are preferably aliphatic amines, diamines and triamines.

The substances to be encapsulated can be, for example, leuco dyestuffs, perfume oils, paraffin oils, plant protection agents, pharmaceuticals or adhesives. The process according to the invention is preferably used for the encapsulation of leuco dyestuffs and plant protection agents. For this purpose, a narrow volume distribution curve with respect to the capsule diameter is often desired. Leuco dyestuffs in the form of a dispersion of microcapsules can be processed further, for example to self-copying papers, and plant protection agents in the form of dispersions of microcapsules can be further processed to so-called "slow-release" formulations. The preparation of the oil-in-water emulsion from which the dispersion of microcapsules originates can be carried out batchwise or continuously.

Substances to be encapsulated according to the invention, lipophilic substances which are capable of polyaddition and are to be used for this purpose, reaction partners which are capable of polyaddition and auxiliaries which are to be employed if appropriate, for example solvents and stabilizers (protective colloids) to be employed in the oily phase, are known as such and for the preparation of microcapsule dispersions.

The process according to the invention has a number of advantages. This is particularly surprising, since according to the invention, contrary to the prior art, an emulsifier is added to the oily phase. The specific amount of energy introduced, which is necessary for the emulsifying step, is thus reduced in the process according to the invention. A given average droplet size can be achieved according to the invention with less energy, or smaller oil droplets are obtained for the same amount of energy introduced. A narrower volume distribution curve for the emulsified oil droplets is often also obtained, which is an improvement in the emulsifying step. Such a narrow volume distribution curve of the emulsified oil droplets is desirable because the microcapsule dispersion resulting from the emulsion has practically the same volume distribution in the dispersed microcapsules. Microcapsules have better use properties, especially if they are processed further for the preparation of copying papers, if a certain width of the distribution curve is not exceeded.

For the preparation of the oil-in-water emulsion, a certain time is necessary to achieve oil droplets of a certain size—depending on the surface tension between the oily and aqueous phase. The average droplet size is usually in the range between 3 and 15 microns, for example if the resulting microcapsule dispersions are intended to be processed to self-copying papers. In the case of systems which are difficult to emulsify, i.e. those having a high surface tension, either a longer time span or the addition of emulsifiers to the aqueous phase is necessary according to the prior art in order to arrive at the desired droplet size. If the emulsifying time is increased, this means that—statistically—a proportion of the particles passes the emulsifying zone several times, which leads to a wider volume distribution curve for the oil droplets in the emulsion. In continuously operating emulsifying machines, this means that the throughput must be limited and/or the energy to be used per unit volume of emulsion to be generated must be increased.

If oil-soluble emulsifiers are added according to the invention to the oily phase, this also results in the advantage of a shorter emulsion time, with often a lower amount of energy introduced per unit volume of emulsion to be generated. If the emulsifying process is designed as a continuous process, the throughput per unit time can be increased, at a constant mount of energy introduced, without this occurring at the expense of the required narrow volume distribution of the oil droplets.

In summary, it can be stated that the procedure according to the invention is advantageous compared with the procedure without emulsifiers or with addition of emulsifiers into the aqueous phase, above all in respect of the saving in energy, duration of the emulsification and width of the distribution curve of the oil drops. It is very surprising that these effects also occur when a water- and oil-soluble emulsifier is used in the oily phase instead of in the aqueous phase (see, for example, the following Examples 1 and 2).

Unless stated otherwise, all the percentage data are percentages by weight.

EXAMPLES

EXAMPLE 1 (for comparison)

A solution is prepared from 30 g of crystal violet lactone, 582 g of a diisopropylnaphthalene isomer mixture and 388 g of a hydrogenated naphthenic petroleum fraction (Nytex® 800) by stirring, heating to 120° C. and cooling again to room temperature. 360 g of this solution were mixed homogeneously with 40 g of the oxadiazinetrione of hexamethylene diisocyanate (prepared in accordance with DE-A 1 670 664; NCO content 21% by weight) and an oily phase was thus obtained.

50 g of polyvinyl alcohol (AIRVOL® 523 type) were dissolved in 1000 g of deionized water, while stirring and heating, a further 3950 g of deionized water were then added, the solution was cooled to room temperature and an aqueous phase was thus obtained. 0.2 g of an emulsifier which was the reaction product of a $C_{10}$–$C_6$ fatty alcohol mixture with 4.4 mol of ethylene oxide was added to 600 g of the aqueous phase.

The oily phase was added to the aqueous phase while stirring rapidly with a laboratory anchor stirrer, and the pre-emulsion thus obtained was convened into a finely dispersed oil-in-water emulsion in a high-speed (8000 revolutions/minute) emulsifying unit (Megatron model) in the course of 3.5 minutes.

A solution of 4.0 g of diethylenetriamine in 41 g of deionized water was added to the oil-in-water emulsion at room temperature, while stirring slowly with a laboratory anchor stirrer. A dispersion of microcapsules with polyurea walls formed spontaneously from the oil-in-water emulsion.

The determination of the average particle diameter and of the width of the volume distribution curve of the microcapsules using a particle size meter (Multisizer II Model) gave the following values:

Average particle diameter: 9.9µ

Width of the volume distribution curve: 63.5% volume content between 5 and 20µ

EXAMPLE 2

Example 1 was repeated, but the 0.2 g of emulsifier was added not to the aqueous phase but to the oily phase before addition of the isocyanate.

A microcapsule dispersion in which the capsules had an average particle diameter of 8.1μ and the width of the volume distribution curve was 78.0% (volume content between 5 and 20μ) was obtained.

EXAMPLE 3 (for comparison)

Example 1 was repeated, but 0.4 g of a reaction product of 1 mol of stearyl alcohol with 7 mol of ethylene oxide was employed as the emulsifier and the emulsifying unit was operated at 9700 revolutions/minute.

A microcapsule dispersion in which the capsules had an average particle diameter of 10.5μ and the width of the volume distribution curve was 75% between 5 and 20μ was obtained.

EXAMPLE 4

Example 3 was repeated, but the 0.4 g of the emulsifier was added to the oily phase before addition of the isocyanate.

A microcapsule dispersion in which the capsules had an average particle diameter of 7.5μ and the width of the volume distribution curve was 75% between 5 and 20μ was obtained.

EXAMPLE 5

A 4% strength solution of crystal violet lactone in a mixture of 70% of a diisobutylbiphenyl isomer mixture and 30% of a hydrogenated naphthenic petroleum fraction was prepared, while stirring and heating. After cooling, 40 g of an isocyanate which was the isocyanurate of hexamethylene diisocyanate with 21% of free NCO groups were added, and an oily phase was thus obtained. 400 g portions of this oily phase were emulsified as described in more detail in Example 1, at 25° C. in 600 g of a 1% strength aqueous polyvinyl alcohol solution, in each case 0.2 g of the emulsifiers A to D mentioned below being added once to the oily phase (according to the invention) and once to the aqueous phase (for comparison). The average particle size of the oil droplets and the percent volume content of the particles of a size above 12μ were determined in the emulsions thus obtained. Details can be seen from Table 1.

Emulsifier A: Reaction product of 1 mol of soya fatty alcohol and 7 mol of ethylene oxide.

Emulsifier B: Reaction product of 1 mol of castor oil fatty alcohol and 10 mol of ethylene oxide.

Emulsifier C: Reaction product of 1 mol of castor oil fatty alcohol with 3.5 mol of ethylene oxide.

TABLE 1

| Emulsifier | Addition to the oily phase | | Addition to the aqueous phase | |
|---|---|---|---|---|
| | average particle size (μ) | % content above 12 μ | average particle size (μ) | % content above 12 μ |
| None | 8.7 | 20.0 | 8.7 | 20.0 |
| A | 6.4 | 2.1 | 7.5 | 10.4 |
| B | 7.8 | 10.9 | 8.4 | 16.5 |
| C | 6.2 | 0.8 | 6.8 | 5.6 |

EXAMPLE 6

An oily phase was prepared from 5700 g of a chlorinated aliphatic paraffin having a chlorine content of 35%, 3800 g of Nytex® 800 (see Example 1), 500 g of crystal violet lactone and 1200 g of the diisocyanate also used in Example 1, by heating and stirring. 400 g portions of this oily phase were emulsified in 600 g portions of a 1% strength polyvinyl alcohol solution in a mixing siren (MS 1FCAB model, Fluid Kotthoff) at 25° C. 0.3 g portions of the emulsifiers D (=fatty alcohol of low degree of ethoxylation from Henkel KGaA) and E (=coconut fatty amine ethoxylated with 4 mol of ethylene oxide) were added once to the oily phase (according to the invention) and once to the aqueous phase (for comparison). The same measurements as in Example 5 were carried out on the particular emulsion obtained. Details are to be found in Table 2.

TABLE 2

| Emulsifier | Addition to the oily phase | | Addition to the aqueous phase | |
|---|---|---|---|---|
| | average particle size (μ) | % content above 12 μ | average particle size (μ) | % content above 12 μ |
| None | 14.4 | 63.0 | 14.4 | 63.0 |
| D | 8.1 | 24.6 | 8.7 | 28.1 |
| E | 7.1 | 22.3 | 7.3 | 25.1 |

EXAMPLE 7

An oily phase was prepared from 2% of a fluoran dyestuff precursor which develops to give black, 2% of a benzoxazine dyestuff precursor which develops to give black, 10% of a trimer of hexamethylene diisocyanate which has a biuret structure and 22% of free NCO groups, and 86% of diisopropylnaphthalene. A 1% strength aqueous polyvinyl alcohol solution formed the aqueous phase. These two phases were fed to a continously operating emulsifying unit (speed of rotation 2700 revolutions/min) in a weight ratio of 40:60.

a) Without addition of emulsifier, 1000 kg per hour of an emulsion having an average particle size of the oil droplets of 6.5μ were obtained. When the hourly throughput was increased to 1300 kg, the average particle size of the oil droplets increased to 7.5μ.

b) With the addition of 0.05% by weight of a $C_{16}$–$C_{18}$-fatty alcohol polyglycol ether ethoxylated with 7 mol of ethylene oxide (in the form of a 10% strength solution in diisopropylnaphthalene) as an emulsifier into the oily phase, 1000 kg per hour of an emulsion having an average particle size of the oil droplets of 5.7μ were obtained.

c) If the procedure was in accordance with b), but with an increased hourly throughput, no substantial change in the emulsion formed occurred up to a throughput of 1450 kg/hour. The average particle size of the oil droplets was 5.6μ.

The above example shows that when the procedure is carried out on a large industrial scale, a reduction in droplet size at a simultaneously greatly increased throughput is achieved with the same expenditure of energy for the emulsification by the emulsifier addition according to the invention into the oily phase.

EXAMPLE 8

The oil-in-water emulsions prepared according to Examples 5, 6 and 7 were each converted, by addition of the stoichiometrically required amount of ethylene-diamine, into a microcapsule dispersion in which the dimensions and size distribution of the capsules approximately corresponded to those of the oil droplets in the emulsion.

What is claimed is:

1. In a process for the preparation of microcapsule dispersions by an interface polyaddition process in which an oil-in-water emulsion is prepared from an oily phase, which comprises the substance to be encapsulated and a lipophilic substance capable of polyaddition, and an aqueous phase, and the reaction partner required for the polyaddition is then added to the aqueous phase, the improvement which comprises the addition of an oil-soluble fatty alcohol polyglycol ether emulsifier of the formula

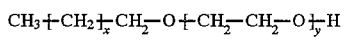

in which x represents an integer from 10 to 16 and y represents an integer from 4 to 12, to the oily phase in the amount of from 0.02 to 1% by weight, based on the oily phase, before the emulsification.

2. The process of claim 1, wherein the substance to be encapsulated is selected from the group consisting of leuco dyestuffs, perfume oils, paraffin oils, plant protection agents, pharmaceuticals and adhesives.

* * * * *